US008285741B1

United States Patent
Ochoa

(10) Patent No.: US 8,285,741 B1
(45) Date of Patent: Oct. 9, 2012

(54) TECHNICAL ORDER DATA TYPE 1 DATASET BUILDER

(75) Inventor: Richard G. Ochoa, Lancaster, CA (US)

(73) Assignee: The Boeing Company, Chicago, IL (US)

(*) Notice: Subject to any disclaimer, the term of this patent is extended or adjusted under 35 U.S.C. 154(b) by 61 days.

(21) Appl. No.: 12/946,850

(22) Filed: Nov. 15, 2010

(51) Int. Cl.
*G06F 7/00* (2006.01)

(52) U.S. Cl. ........ 707/769; 707/602; 707/791; 707/793; 707/804

(58) Field of Classification Search .......... 707/602, 707/791, 793, 804, 769
See application file for complete search history.

(56) References Cited

U.S. PATENT DOCUMENTS

| | | | |
|---|---|---|---|
| 7,099,727 B2 * | 8/2006 | Wu et al. | 700/104 |
| 7,596,416 B1 * | 9/2009 | Maluf et al. | 700/1 |
| 2006/0190544 A1 * | 8/2006 | Chikirivao et al. | 709/206 |
| 2006/0200753 A1 * | 9/2006 | Bhatia et al. | 715/505 |

* cited by examiner

*Primary Examiner* — Etienne LeRoux
*Assistant Examiner* — Cindy Nguyen
(74) *Attorney, Agent, or Firm* — Ameh IP; Elahe Toosi; Lowell Campbell

(57) ABSTRACT

A method and system for building a relational database is disclosed. An input file is converted to obtain a converted file comprising a plurality of data element types, and the data element types are formatted and concatenated to obtain formatted data comprising a tag associated with each of the data element types. The formatted data within an identified structure is filtered by the tag to identify an identified data element type form the plurality of data element types. At least one relational identifier is correlated to the identified data element type to obtain a relational dataset, and the relational dataset is stored in a table corresponding to the identified data element type to build a task information relational database for the identified structure.

20 Claims, 5 Drawing Sheets

TECHNICAL ORDER DATA TYPE 1 DATASET BUILDER

FIELD

Embodiments of the present disclosure relate generally to relational databases. More particularly, embodiments of the present disclosure relate to a task and time based relational database tool.

BACKGROUND

Manufacture of large complex devices such as aircraft, ships, and microelectronics require an effect definition of technical requirements. Technical order data (TOD) is a type of requirements definition that can be used for describing aircraft parts, related maintenance procedures, and resource requirements. TOD may use a standard generalized markup language such as ISO 8879:1986 SGML for aircraft part documents. Extensible markup language (XML) is a subset of SGML designed to ease implementation compared to a full SGML parser, and currently more widely used than full SGML.

SUMMARY

Research, planning, and scheduling by using outdated or inconsistent data sources may be time consuming. Data within SGML formatted TOD are identified and extracted from files by parsing and interpreting valid SGML and XML tags. Data elements (data element types) are extracted from SGML and XML files enable development of tools for integrated planning, scheduling, and decision-making that would not otherwise be possible in existing environments using Type 1 TOD. Resulting relational databases are a core of planning and automated scheduling tools that permit pre-positioning of kits and assets, greater accuracy in overall task and project durations, and project synchronization while reducing effort to produce plans and schedules by greater than 90%.

In a first embodiment, a database builder tool comprises a conversion module, a formatting and concatenating module, a search module, a correlator module and a memory module. The conversion module converts an input file to obtain a converted file comprising a plurality of data element types. The formatting and concatenating module formats and concatenates the data element types to obtain formatted data comprising a tag associated with each of the data element types. The search module filters the formatted data in an identified structure by the tag to identify an identified data element type form the plurality of data element types. The correlator module correlates at least one relational identifier to the identified data element type to obtain a relational dataset. And the memory module stores the relational dataset in a table corresponding to the identified data element type to build a task information relational database for the identified structure.

In a second embodiment, a method of building database converts an input file to obtain a converted file comprising a plurality of data element types. The method further formats and concatenates the data element types to obtain formatted data comprising a tag associated with each of the data element types. The method then filters the formatted data in an identified structure by the tag to identify an identified data element type from the plurality of data element types. The method further correlates the at least one relational identifier to the identified data element type to obtain a relational dataset. The method then stores the relational dataset in a table corresponding to the identified data element type to build a task information relational database for the identified structure.

In a third embodiment, a computer readable storage medium comprises computer-executable instructions for building a database. The computer-executable instructions convert an input file to obtain a converted file comprising a plurality of data element types. The computer-executable instructions further format and concatenate the data element types to obtain formatted data comprising a tag associated with each of the data element types. The computer-executable instructions also filter the formatted data in an identified structure by the tag to identify and identified data element type form the plurality of data element types and correlate the at least one relational identifier to the identified data element type to obtain a relational dataset. The computer-executable instructions also store the relational dataset in a table corresponding to the identified data element type to build a task information relational database for the identified structure.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
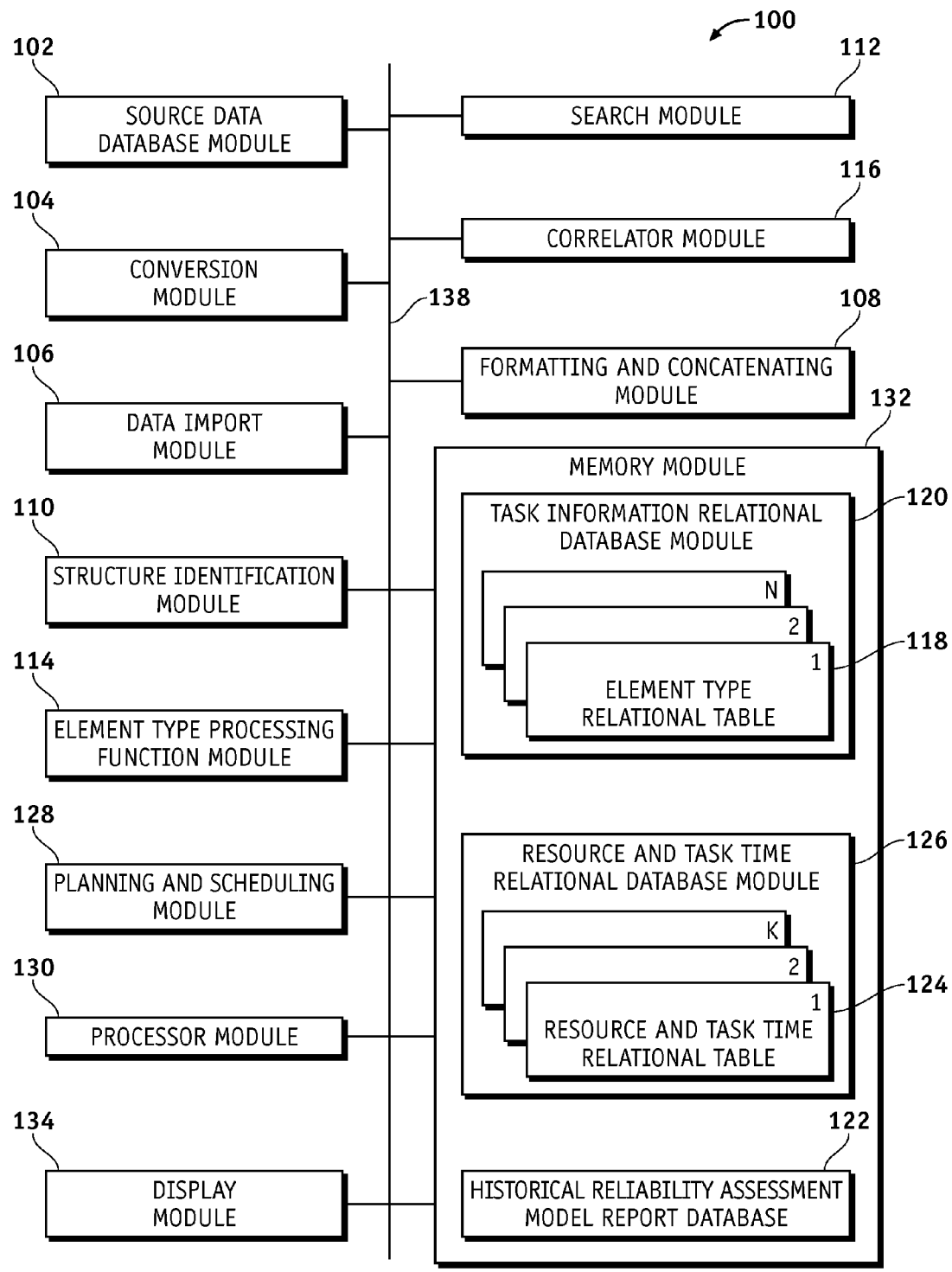
FIG. 1 is an illustration of an exemplary functional block diagram of a technical order relational database builder tool according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to database building, data acquisition, data storage, computation, and other functional aspects of the systems (and the individual operating components of the systems) may not be described in detail herein. In addition, those skilled in the art will appreciate that embodiments of the present disclosure may be practiced in conjunction with a variety of computational machines, and that the embodiments described herein are merely example embodiments of the disclosure.

Embodiments of the disclosure are described herein in the context of a practical non-limiting application, namely, electronic technical order data (TOD). Embodiments of the disclosure, however, are not limited to such TOD application, and the techniques described herein may also be utilized in other relational database building. For example but without limitation, embodiments may be applicable to medical data, bills, books, maps, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Manual research, planning, and scheduling by use of spreadsheets from outdated or inconsistent data sources is time consuming. Electronic technical order data (TOD) verification tracking, change requests, planning, and scheduling efforts for, for example, a major weapon system may be difficult at best due to inconsistent sources of master task lists, resources, task dependencies, and pending/completed change requests. Type 1 TOD is TOD stored in a 2-dimensional page format, and type 2 TOD is TOD stored in a database format. The Type 1 dataset builder enables data element types (i.e., tasks and time) to be extracted directly from Type 1 TOD in Standard Generalized Markup Language (SGML), Extensible Markup Language (XML), or portable document format (PDF) format and correlated into a relational database that enables the development of real time research, planning, automated scheduling, TOD change request, kit list generation, and test integration tools for TOD verification management, ground test management, test activity integration (i.e., verifications, and ground test, modifications). Type 1 TOD dataset builder allows for new or updated datasets to be built as revisions to TOD became available. When used in conjunction with automated planning and scheduling tools, the Type 1 TOD dataset builder allows maintenance and test activities to be aligned with aircraft/vehicle/structure availability and opportunity on an ADHOC basis. Additionally, the Type 1 TOD dataset builder allows automated generation of depot work card decks for High Velocity Maintenance (HVM) to support parts, tools, data, equipment pre-positioning at point of use, maximum use of kitting, and integrated planning, decision-making, and data collection.

SGML and XML can use tags, which identify data elements. SGML and XML tags can also contain attributes about the data elements. An XML tag can be written between angled brackets, where a "<" symbol starts the XML tag and a ">" symbol ends the XML tag. "<datatag>" is an example of a starting tag. A pair of tags can be used to enclose a data element, and a "/" in a tag can be used to indicate an ending tag (e.g., "</datatag>"). In XML, starting tags are paired with ending tags, with data in between (e.g., "<datatag>data</datatag>").

According to embodiment of the disclosure, data within SGML formatted TOD are identified and extracted from files by parsing and interpreting valid SGML and XML tags. Data elements (data element types) are extracted from SGML and XML files enabling the development of tools for integrated planning, scheduling, and decision-making that would not otherwise be possible in existing environments using Type 1 TOD. Resulting relational databases are the core of planning and automated scheduling tools that permit pre-positioning of kits and assets, greater accuracy in overall task and project durations, and project synchronization while reducing effort to produce plans and schedules by greater than 90%.

FIG. 1 is an illustration of an exemplary functional block diagram of a technical order relational database builder system 100 according to an embodiment of the disclosure. The system 100 may comprise, for example but without limitation, a desktop, a laptop computer, a notebook computer, a hand-held computing device (PDA, cell phone, palmtop, etc.), a mainframe, a server, a client, or any other type of special or general purpose computing device as may be desirable or appropriate for a given application or environment. The system 100 generally comprises a source data database module 102, a conversion module 104, a data import module 106, a formatting and concatenating module 108, a structure identification module 110, a data element type processing function module 114, a search module 112, a correlator module 116, a planning and scheduling module 128, a processor module 130, a memory module 132, and a display module 134.

A practical system 100 may comprise any number of input modules, any number of processor modules, any number of memory modules comprising any number of databases, any number of display modules, and any number of modules mentioned above. The illustrated system 100 depicts a simple embodiment for ease of description. These and other elements of the system 100 are interconnected together, allowing communication between the various elements of system 100. In one embodiment, these and other elements of the system 100 may be interconnected together via a communication link 138. Those of skill in the art will understand that the various illustrative blocks, modules, circuits, and processing logic described in connection with the embodiments disclosed herein may be implemented in hardware, computer-readable software, firmware, or any practical combination thereof.

To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

Figure 2:
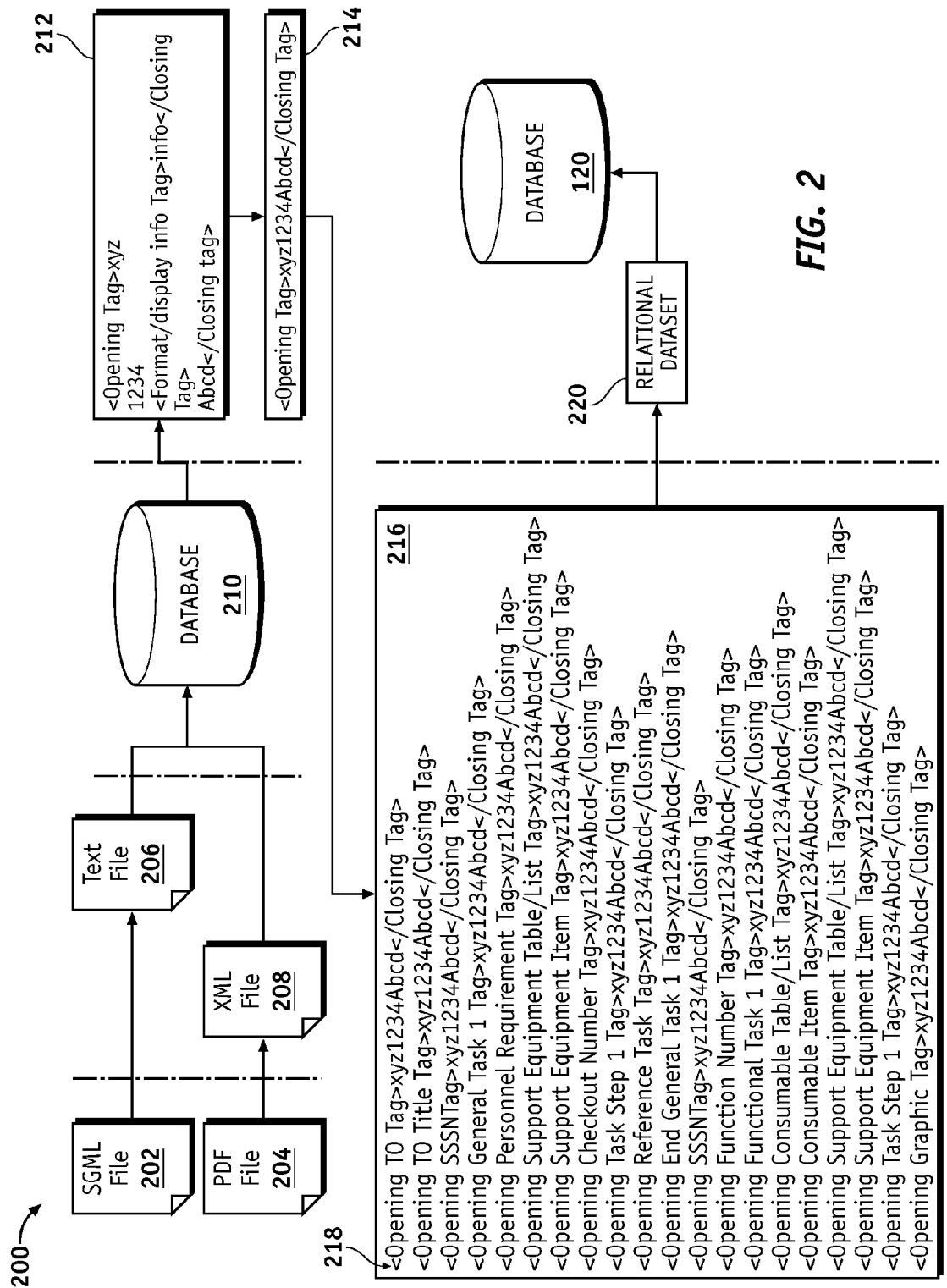
FIG. 2 is an illustration of an exemplary flowchart showing a technical order relational database builder process according to an embodiment of the disclosure.

System 100 is described in more detail below in conjunction with FIG. 2. FIG. 2 is an illustration of an example showing a technical order relational database builder process 200 for building a task information relational database 120 according to an embodiment of the disclosure.

System 100 creates and assembles relational databases based on various structures (data sources) as explained below. Scripting is used to read and extract pertinent data comprising data element types, for example from SGML and XML files, and relate extracted data by task number or SSSN similar to a way Type 2 data (soft data) is related by task identifiers or Logistics Control Numbers (LCN). TOD in PDF format can also be converted to XML format for data extraction. Additional scripting extract task times from historical reliability assessment model report database (HARAM) reports to correlate task numbers to task times. Additional scripting may also be used for the purpose of correlating and creating a resource and time relational database 126. As mentioned above, a resulting relational dataset is the core of planning and automated scheduling tools that permit pre-positioning of kits and assets, greater accuracy in overall task and project durations, and project synchronization while reducing effort to produce plans and schedules by greater than 90%.

The source data module 102 comprises input data from various data files such as but without limitation, Type 1 TOD data file, and the like, as explained in more detail below. The Type 1 TOD files may comprise, for example but without limitation, a SGML file 202 (FIG. 2), a PDF file 204, and the like. SGML is an International Standard that describes the relationship between a document's content and its structure. SGML identifies document elements such as titles, paragraphs, tables, and chapters as distinct objects, allowing users to define the relationships between the objects for structuring data in documents. Once a document is converted into SGML and the information is tagged, it becomes a database-like document. In this manner, the document can be searched, printed or even programmatically manipulated by SGML-aware applications. PDF uses the PostScript printer description language and is highly portable across computer platforms.

The conversion module 104 converts the SGML file 202 and the PDF file 204 to obtain a converted file comprising a plurality of data element types. The conversion module 104 converts the PDF file 204 to the XML file 208 and the SGML file 202 to text file 206. An XML file comprises an XML format comprising a set of rules for encoding documents in machine-readable form. The XML comprises tags and elements. As mentioned above, a tag is a markup construct that begins with "<" and ends with ">". Tags come in three flavors: start-tags, for example <section>, end-tags, for example </section>, and empty-element tags, for example <linebreak/>. An element is a logical component of a document which either begins with a start-tag and ends with a matching end-tag, or comprises only of an empty-element tag. Characters between the start and end-tags, if any, are the element's content (data element type), and may contain markup, including other elements, which are called child elements. An example of a start tag, an end-tag and a data element type is <Opening TO Tag>xyz1234Abcd</Closing Tag> (214/218 in FIG. 2) the data element type is xyz123Abcd in this example.

The data element types, may comprise, for example but without limitation, TOD book numbers, SSSN, work unit code (WUC), reference designator (REFDES), maintenance procedures/functions, aircraft/vehicle/device applicability, reference tasks/task dependencies, maintenance task type, access data (panels/doors/parts), required conditions, personnel & quantity recommended, support equipment, safety conditions, supplies/consumables, preparation, follow-on maintenance tasks, maintenance task procedural steps, maintenance task times, and the like. Some data element types may comprise other data element types embedded within as explained in more detail below.

The data import module 106 imports the data element types from the converted files such as the text file 206 and the XML file 208 to a raw data database 210 (FIG. 2).

The formatting and concatenating module 108 removes extraneous presentation and content data not associated with pre-defined structures, then formats and concatenates the data element types to obtain formatted data comprising a tag associated with each of the data element types. This is because some data discontinuity may occur during data conversion. For example when the SGML file 202 is converted to the text file 206, the text file 206 instead of having a single record 214 comprising an opening tag, an ending tag and the data element type therebetween, it may have been parsed on import into a few more records 212 as stored in the raw data database 210. The formatted data may be stored in the raw data database 210 as well.

The structure identification module 110 identifies a pre-defined hierarchical information structure (identified structure) by topic (format, expected or potential groups of related data element types). The identified structure comprises, for example but without limitation, work unit code (WUC) manuals, job guides, general system manuals, modification files (supplemental data), fault reporting manual, reliability & maintainability information system (REMIS), and the like. Each of the identified structure comprises various types of topic related information comprising individual data element types (i.e., consumable part numbers and nomenclatures) or combinations of related data element types (i.e., functional task, personnel requirements, support equipment requirements, etc.).

For example, the WUC manuals may comprise data element types, such as but without limitation, WUC, SSSN, REFDES lists and correlations, and the like. For another example, the general system manuals may comprise data element types, such as but without limitation, theory of operation, functional description, system special maintenance requirements, consumable materials list, support equipment list, fault code index, parameters monitor code index, connector/pin/schematic/test, and the like. For another example, job guides may comprise data element types, such as but without limitation, technical order data book numbers, SSSN, maintenance procedures/functions, vehicle applicability (affectivity by vehicle and configuration), REFDES, applicable functions (referenced tasks), access data (related access panels and/or doors), required conditions, personnel and quantity recommended, support equipment, safety conditions, supplies/consumables, preparation, follow-on maintenance tasks, task type (general or functional), task number (unique identifier), maintenance function, maintenance task (procedural steps), and the like.

Topic related information may have expected patterns or groupings of data element type (i.e., consumable data may comprise part number and nomenclature data elements in a list or table presentation format) or potential patterns or groupings of data element types with data content in a string, list, or table presentation format. Potential patterns or groupings of data elements may comprise, for example but without limitation, tasks (general type or functional type) with personnel requirements (expected), support equipment (potential), consumables (potential), and sequenced procedural steps (expected) with embedded references to other general/functional tasks (potential), fault codes (potential), or access panel/door locators (potential) that must be followed before proceeding to subsequent steps, and the like.

As mentioned above, data element types may have other data element types embedded within them. For example but without limitation, procedural steps may have references to other tasks that must be performed. Other embedded data element types may comprise, for example but limitation, related fault codes, related access panels/doors, and the like.

Some data element types may have more than one type. For example, task type general may require support equipment, task type functional may require support equipment and consumables, and each task type may reference the other task type.

The data element type processing function module 114, selects data element type processing function(s) corresponding to the identified data element type. The data element type processing function comprises a script defining specific information regarding, for example, relative location of a specific data element type (i.e., general task, consumable materials, etc.). In this manner, the searcher module 112 can perform an intelligence search when searching for various kinds of information related to the specific data element type.

The search module 112 filters the formatted data within an identified structure by the tag to identify an identified data element type from the plurality of data element types. The search module 112 also searches the formatted data for at least one relational identifier (task number) using the selected data element type processing function (i.e., script). The relational identifier may comprise for example but without limitation, the task number, SSSN, WUC, and the like. In this manner, data element types within SGML formatted TOD are identified and extracted from files by parsing and interpreting valid SGML and XML tags. Additional scripting extract task times from historical reliability assessment model report database (HARAM) reports to correlate task numbers to task times.

The correlator module 116 correlates at least one relational identifier such as the task number, SSSN, WUC, or the like, to the identified data element type to obtain a relational dataset 220 (FIG. 2) that can be accessed by a user among various relational databases by searching for their common task number, SSSN, or WUC. Additional scripting may also be used for correlating the at least one relational identifier to the identified data element. The correlator module 116 also correlates the task time data to the identified data element type in the task information relational database 120 to obtain a correlated time task data, thereby enabling the development of tools for integrated planning, scheduling, and decision-making that would not otherwise be possible in existing environments using Type 1 TOD. The resulting task time relational database 126 allows providing planning and automated scheduling tools that permit pre-positioning of kits and assets, greater accuracy in overall task and project durations, and project synchronization while reducing effort to produce plans and schedules by greater than 90%.

The planning and scheduling module 128, automatically plans and schedule a task by accessing the resource and task time relational database 126 as explained in more detail below in the context of discussion of FIG. 5.

The processor module 130 is configured to support functions of the system 100. The processor module 130 may control operations of the system 100 so that processes of the system 100 are suitably performed. For example, the processor module 130 controls operations of the system 100 to access the raw data database 210, search for the data element types, and store the data element types along with their relational identifier in the task information relational database 120. The processor module 130 also controls operations of the system 100 to build the resource and task time relational database 126. The processor module 130 uses the planning and scheduling module 128 to automatically plan and schedule a task by accessing the resource and task time relational database 126 allowing simplified development and optimization of planning and scheduling of, for example but without limitation, large manufacturing operations.

The processor module 130 also controls the display module 134 to display input/output parameters, and the like. Further, the processor module 130 accesses the memory module 132 such as access to the databases 120/122/126. The processor module 130, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the processor module 130 comprises processing logic that is configured to carry out the functions, techniques, and processing tasks associated with the operation of system 100. In particular, the processing logic is configured to support operation of the system 100 to create and assemble relational databases such as the task information relational database 120, and the resource and task time relational database 126 such that an efficient planning and schedule can be performed.

The memory module 132 may be any suitable data storage area with suitable amount of memory that is formatted to support the operation of the system 100. Memory module 132 is configured to store, maintain, and provide data as needed to support the functionality of the system 100 in the manner described below. The memory module 132 may be coupled to the processor module 130 and configured to store, for example but without limitation, the relational dataset 220 in a data element type relational table 118 (1-N) corresponding to the identified data element type to build a task information relational database 120 for the identified structure as explained above.

The memory module 132 may also store, for example but without limitation, the correlated time task data in the source and task time relational table 124 (1-K) to build the resource and task time relational database 126 as explained in more detail below. Additionally, memory module 132 may comprise updating various tables (e.g., 1-N, and 1-K) for purpose of updating and storing information relating to each data element type in their respective tables (e.g., 1-N, and 1-K). The memory module 132 may store resource and task time information in one relational database such as the resource and task time relational database module 126, or may store the resource and task time information in separate relational databases; one comprising the resource information, and other comprising the task time information.

In practical embodiments, the memory module 132 may comprise, for example but without limitation, a non-volatile storage device (non-volatile semiconductor memory, hard disk device, optical disk device, and the like), a random access storage device (i.e., SRAM, DRAM), or any other form of storage medium known in the art. The memory module 132 may also store, a computer program that is executed by the processor module 130, an operating system, an application program, tentative data used in executing a program processing, and the like. The memory module 132 may be coupled to the processor module 130 such that the processor module 130 can read information from and write information to memory module 132. As an example, the processor module 130 and memory module 132 may reside in their respective ASICs. The memory module 132 may also be integrated into the processor module 130. In an embodiment, the memory module 132 may comprise a cache memory for storing temporary variables or other intermediate information during execution of instructions to be executed by the processor module 130.

The display module 134 is configured to display input and output parameters of the system 100. The display module 134 displays, for example but without limitation, a list of data element types 216, tables 1-N, tables 1-K, and the like. The display module 134 accepts an operation command, and outputs operation command information to the processor module 130 in response to the accepted operation command. The display module 134 may be formed by, for example but without limitation, an organic electro-luminescence (OEL) panel, liquid crystal panel (LCD), and the like. Various kinds of information can be displayed on the display module 134 via an image/video signal supplied from the processor module 130.

Figure 4:
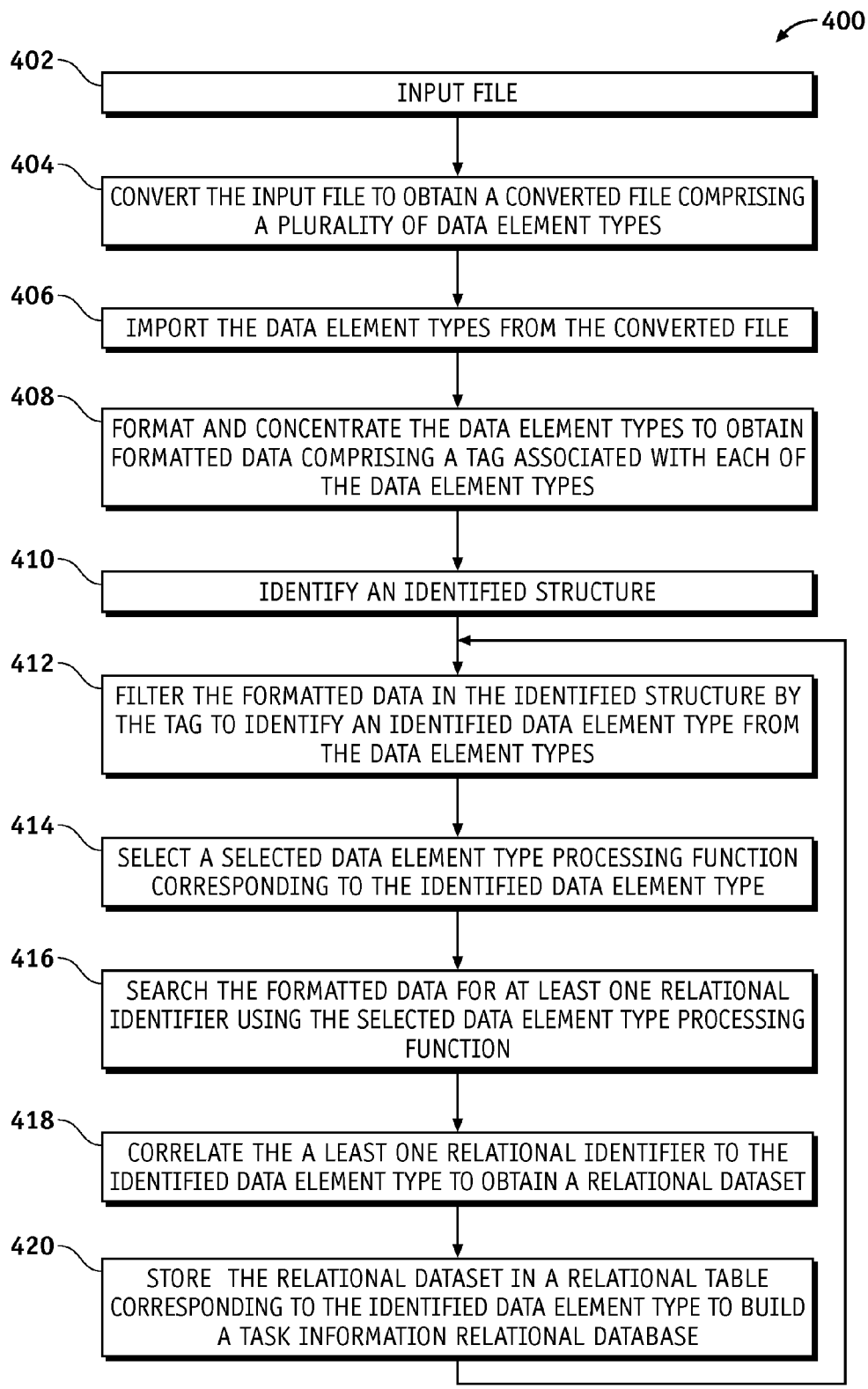
FIG. 4 is an illustration of an exemplary flowchart showing a technical order relational database builder process according to an embodiment of the disclosure.

FIG. 4 is an illustration of an exemplary flowchart showing a technical order relational database builder process 400 according to an embodiment of the disclosure. The various tasks performed in connection with process 400 may be performed, by software, hardware, firmware, a computer-readable medium having computer executable instructions for performing the process method, or any combination thereof. The process 400 may be recorded in a computer-readable medium such as a semiconductor memory, a magnetic disk, an optical disk, and the like, and can be accessed and executed, for example, by a computer CPU such as the processing module 130 in which the computer-readable medium is stored. It should be appreciated that process 400 may include any number of additional or alternative tasks, the tasks shown in FIG. 4 need not be performed in the illustrated order, and the process 400 may be incorporated into a more comprehensive procedure or process having additional functionality not described in detail herein.

For illustrative purposes, the following description of the process 400 may refer to elements mentioned above in connection with FIGS. 1-3. In practical embodiments, portions of the process 400 may be performed by different elements of the system 100 such as: the source data database module 102, the conversion module 104, the data import module 106, the formatting and concatenating module 108, the structure identification module 110, the data element type processing function module 114, the search module 112, the correlator module 116, the planning and scheduling module 128, the processor module 130, the memory module 132, and the display module 134. The process 400 may have functions, material, and structures that are similar to the embodiments shown in FIGS. 1-3. Therefore common features, functions, and elements may not be redundantly described here.

Process 400 may begin by the input source data module 102 providing an input file such as the SGML file 202 and/or the PDF file 204 (task 402).

Process 400 may then continue by the conversion module 104 converting the input file (SGML file 202/PDF file 204) to obtain a converted file such as the text file 206 and the XML file 208 comprising a plurality of data element types (task 404).

Process 400 may then continue by the data import module 106 importing the data element types 216 from the converted file (task 406).

Process 400 may then continue by the formatting and concatenating module 108 removing extraneous presentation and content information not associated with a pre-defined structure, then formatting and concatenating the data element types to obtain formatted data in individual records 214 comprising a tag associated with each of the data element types (task 408).

Process 400 may then continue by the structure identification module 110 identifying and identified structure (task 410).

Process 400 may then continue by the search module 112 filtering the formatted data in the identified structure by the tag to identify an identified data element type from the plurality of data element types (task 412).

Process 400 may then continue by the data element type processing function module 114 selecting a selected data element type processing function corresponding to the identified data element type (task 414). As explained above, the data element type processing function comprises a script defining specific information regarding, for example, relative location of a specific data element type (i.e., general task, consumable materials, etc.).

Process 400 may then continue by the search module 112 searching the formatted data for at least one relational identifier using the selected data element type processing function (task 416).

Process 400 may then continue by the correlator module 116 to correlate at least one relational identifier to the identified data element type to obtain a relational dataset such as the relational dataset 220 (task 418).

Process 400 may then continue by the memory module 132 to store the relational dataset in a table such as the tables 1-N corresponding to the identified data element type to build the task information relational database 120 for the identified structure (task 420). Process 400 may then lead back to the task 412.

Figure 5:
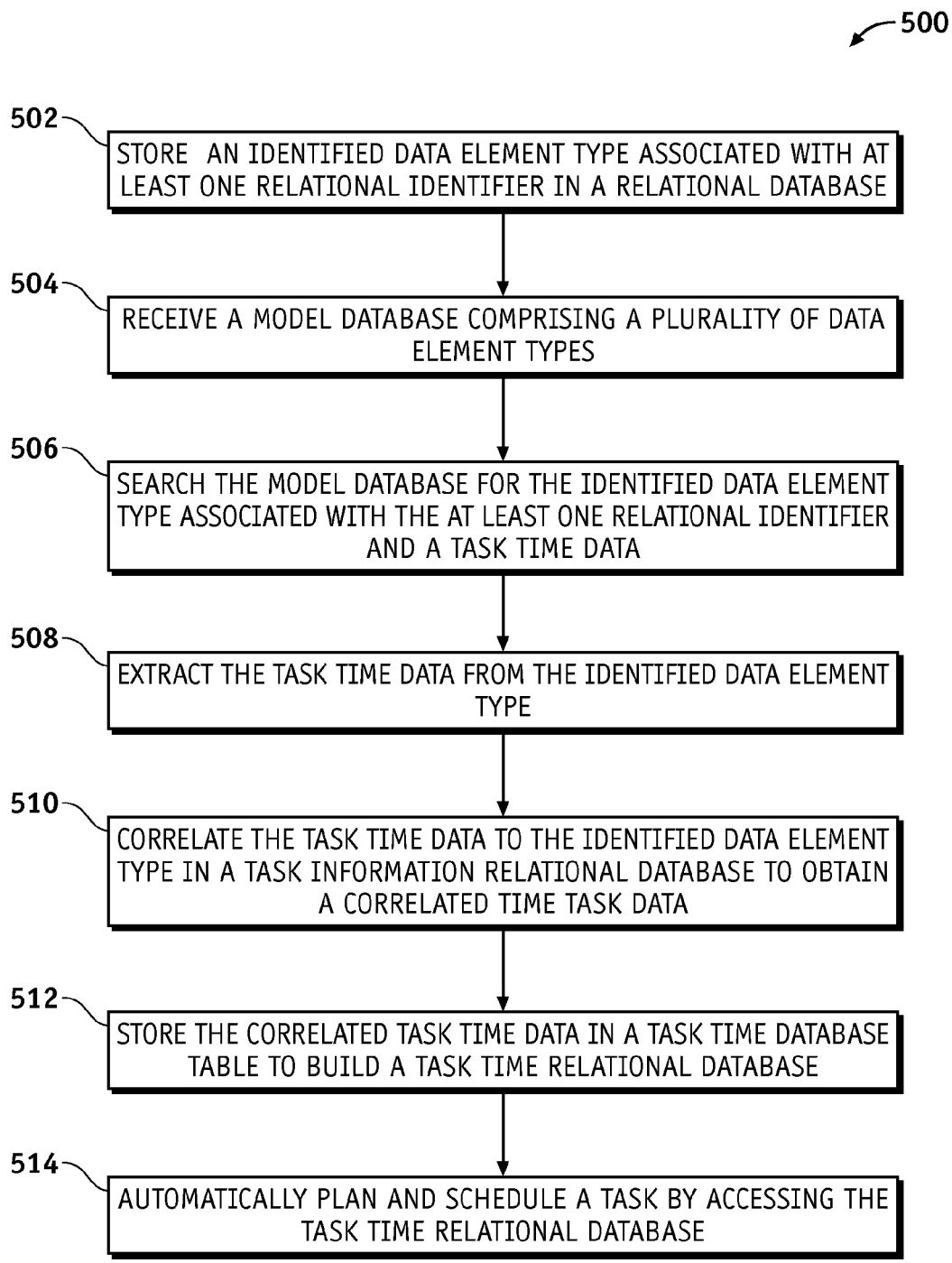
FIG. 5 is an illustration of an exemplary flowchart showing a process for using a technical order relational database builder according to an embodiment of the disclosure.

FIG. 5 is an illustration of an exemplary flowchart showing a process 500 for using a technical order relational database builder according to an embodiment of the disclosure. The various tasks performed in connection with process 500 may be performed, by software, hardware, firmware, a computer-readable medium having computer executable instructions for performing the process method, or any combination thereof. The process 500 may be recorded in a computer-readable medium such as a semiconductor memory, a magnetic disk, an optical disk, and the like, and can be accessed and executed, for example, by a computer CPU such as the processor module 130 in which the computer-readable medium is stored. It should be appreciated that the process 500 may include any number of additional or alternative tasks, the tasks shown in FIG. 5 need not be performed in the illustrated order, and the process 500 may be incorporated into a more comprehensive procedure or process having additional functionality not described in detail herein.

Figure 3:
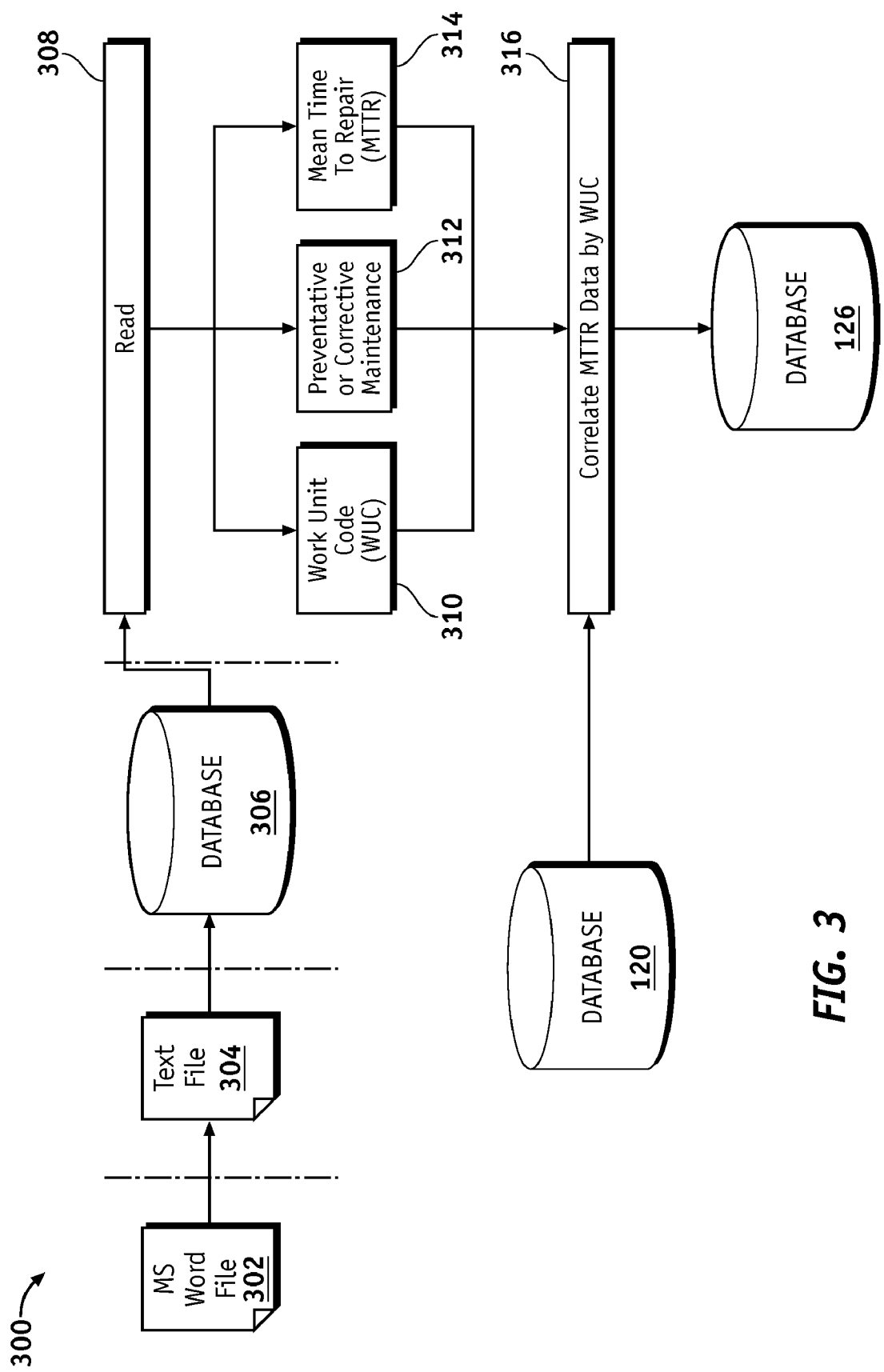
FIG. 3 is an illustration of an exemplary flowchart showing a technical order relational database builder process according to an embodiment of the disclosure.

For illustrative purposes, the following description of the process 500 may refer to elements mentioned above in connection with FIGS. 1-4. In practical embodiments, portions of the process 500 may be performed by different elements of the system 100 such as: the source data database module 102, the conversion module 104, the data import module 106, the formatting and concatenating module 108, the structure identification module 110, the search module 112, the data element type processing function module 114, the correlator module 116, the planning and scheduling module 128, the processor module 130, the memory module 132, and the display module 134. The process 500 may have functions, material, and structures that are similar to the embodiments shown in FIGS. 1-4. Therefore common features, functions, and elements may not be redundantly described here. The process 500 is described below in conjunction with FIG. 3. FIG. 3 is an illustration of an exemplary flowchart showing a technical order relational database builder process 300 for building the resource and task time relational database 126 according to an embodiment of the disclosure.

Process 500 may begin by the memory module 132 storing the identified data element type associated with at least one relational identifier in a relational database (task 502).

Process 500 may then continue by the historical reliability assessment model report module 122 receiving a model database 306 (FIG. 3) comprising a plurality of data element types (task 504). The model database 306 may be received in a file 302 comprising an original format such as an MS word format and then converted to another file comprising another format such a text format 304.

Process 500 may then continue by the search module 112 searching the model database 306 for the identified data element type associated with the at least one relational identifier and a task time data (task 506). For example, the search module 112 reads 308 the model database 306 associated with the WUC 310 as the at least one relational identifier.

Process 500 may then continue by the search module 112 extracting the task time data from the identified data element type (task 508). For example, the search module 112 reads 308 the model database 306 and finds a mean time to repair (MTTR) 314 as the task time data. Scripting may be used to extract the MTTR 314 from the model database 306.

Process 500 may then continue by the correlator module 116 correlating (316 in FIG. 3) the task time data such as the MTTR 314 to the identified data element type 312 using the WUC 310 in the task information relational database 120 to obtain a correlated time task data (task 510).

Process 500 may then continue by the memory module 132 storing the correlated time task data in the resource and task time relational table 124 to build the resource and task time relational database 126 (task 512).

Process 500 may then continue by the planning and scheduling module 128 automatically planning and scheduling a task by accessing the resource and task time relational database 126 (task 514).

In this way a relational database is built form the Type 1 TOD data that can be used as planning and automated scheduling tools that permit pre-positioning of kits and assets, greater accuracy in overall task and project durations, and project synchronization while reducing effort to produce plans and schedules significantly.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processing module 130 to cause the system 100 to perform specified operations. Such instructions, generally referred to as "computer-executable instructions", "computer program code", or "program code" (which may be grouped in the form of computer programs or other groupings), when executed, enable the relational database building method of the system 100.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 1 depicts example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A database builder tool comprising:
a conversion module operable to convert an input file by action of a processor module to obtain a converted file comprising a plurality of data element types;
a formatting and concatenating module operable to by action of the processor module:
remove extraneous presentation and content data not associated with pre-defined structures from the converted file; and
format and concatenate the data element types to obtain formatted data comprising a tag associated with each of the data element types;

a search module operable to by action of the processor module:
    filter the formatted data in an identified structure by the tag to identify an identified data element type among the plurality of data element types; and
    search the formatted data for at least one relational identifier using a selected data element type processing function to locate various kinds of information related to the data element types;
a correlator module operable by action of the processor module to correlate the at least one relational identifier to the identified data element type to create a relational dataset; and
a memory module operable to store the relational dataset within a table corresponding to the identified data element type to build a task information relational database for the identified structure.

2. The database builder tool according to claim 1, further comprising a data element type processing function module operable to select the selected data element type processing function corresponding to the identified data element type.

3. The database builder tool according to claim 2, further comprising updating the relational dataset.

4. The database builder tool according to claim 1, further comprising a structure identification module operable to identify an identified structure comprising a pre-defined hierarchical information structure by at least one of: a format, an expected group, potential groups, and the data element types.

5. The database builder tool according to claim 1, further comprising a data import module operable to import the data element types from the converted file.

6. The database builder tool according to claim 1, wherein the correlator module is further operable to correlate a task time data to the identified data element type in the task information relational database to obtain a correlated time task data.

7. The database builder tool according to claim 6, wherein the memory module is further operable to store the correlated time task data in a resource and task time relational table to build a resource and task time relational database.

8. The database builder tool according to claim 7, further comprising a planning and scheduling module operable to automatically plan and schedule a task by accessing the resource and task time relational database.

9. The database builder tool according to claim 1, wherein the identified structure comprises an identified structure selected from at least one of the group consisting of: manuals, job guides, general system manuals, modification files, fault reporting manual, and reliability and maintainability information system.

10. The database builder tool according to claim 1, wherein the data element types comprise a data element type selected from at least one of the group consisting of: technical order data book numbers, system/subsystem/subject number, work unit code, reference designator, maintenance procedures/functions, vehicle applicability, reference tasks/task dependencies, maintenance function, access data, required conditions, personnel and quantity recommended, support equipment, safety conditions, supplies/consumables, preparation, follow-on maintenance tasks, maintenance task procedural steps, support equipment list, fault code index, and maintenance task times.

11. The database builder tool according to claim 1, wherein the input file comprises a PDF format, an MS Word format, and an SGML format.

12. The database builder tool according to claim 1, wherein the converted file comprises a format selected from at least one of the group consisting of: a text format, and an XML format.

13. A method of building database, the method comprising:
    converting an input file by action of a processor module to obtain a converted file comprising a plurality of data element types;
    formatting and concatenating the data element types by action of the processor module to remove extraneous presentation and content data not associated with pre-defined structures from the converted file and to obtain formatted data comprising a tag associated with each of the data element types;
    filtering by action of the processor module the formatted data within an identified structure by the tag to identify an identified data element type among the plurality of data element types;
    searching the formatted data by action of the processor module for at least one relational identifier using a selected data element type processing function to locate various kinds of information related to the data element types;
    correlating the at least one relational identifier by action of the processor module to the identified data element type to create a relational dataset; and
    storing the relational dataset in a memory module in a table corresponding to the identified data element type to build a task information relational database for the identified structure.

14. The method of claim 13, further comprising:
    selecting a selected data element type processing function corresponding to the identified data element type, wherein the selected data element type processing function comprises a script.

15. The method of claim 13, further comprising:
    correlating a task time data to the identified data element type in the task information relational database to obtain a correlated time task data;
    storing the correlated time task data in a task time database to build a resource and task time relational database; and
    automatically planning and scheduling a task by accessing the resource and task time relational database.

16. The method of claim 13, wherein the identified structure comprises a structure selected from at least one the group consisting of: manuals, job guides, general system manuals, modification files, fault reporting manual, and reliability and maintainability information system.

17. The method of claim 13, wherein the data element types comprise a data element type selected from at least one of the group consisting of: technical order data book numbers, system/subsystem/subject number, work unit code, reference designator, maintenance procedures/functions, vehicle applicability, reference tasks/task dependencies, maintenance function, access data, required conditions, personnel and quantity recommended, support equipment, safety conditions, supplies/consumables, preparation, follow-on maintenance tasks, maintenance task procedural steps, support equipment list, fault code index, and maintenance task times.

18. A non-transitory computer readable storage medium comprising computer-executable instructions for building a database, the compute-executable instructions comprising:
    converting an input file to obtain a converted file comprising a plurality of data element types;
    formatting and concatenating the data element types to obtain formatted data comprising a tag associated with each of the data element types and remove extraneous presentation and content data not associated with predefined structures from the converted file;

filtering the formatted data within an identified structure by the tag to identify an identified data element type among the plurality of data element types;

searching the formatted data for at least one relational identifier using a selected data element type processing function to locate various kinds of information related to the data element types;

correlating at least one relational identifier to the identified data element type to obtain a relational dataset; and storing the relational dataset in a table corresponding to the identified data element type to build a task information relational database for the identified structure.

19. The non-transitory computer readable storage medium according to claim 18, further comprising computer-executable instructions for:

correlating a task time data to the identified data element type in the task information relational database to obtain a correlated time task data;

storing the correlated time task data in a task time database to build a resource and task time relational database; and automatically planning and scheduling a task by accessing the resource and task time relational database.

20. The non-transitory computer readable storage medium of claim 18, wherein the data element types comprise a data element type selected from at least one of the group consisting of: technical order data book numbers, system/subsystem/subject number, work unit code, reference designator, maintenance procedures/functions, vehicle applicability, reference tasks/task dependencies, maintenance function, access data, required conditions, personnel and quantity recommended, support equipment, safety conditions, supplies/consumables, preparation, follow-on maintenance tasks, maintenance task procedural steps, support equipment list, fault code index, and maintenance task times.

* * * * *